United States Patent
Moran et al.

(10) Patent No.: US 10,549,874 B2
(45) Date of Patent: Feb. 4, 2020

(54) POUCH MACHINE WITH SEALER

(71) Applicant: CMD Corporation, Appleton, WI (US)

(72) Inventors: Daniel J. Moran, Appleton, WI (US); Peter T. Hunnicutt, Greenville, WI (US)

(73) Assignee: CMD Corporation, Appleton, WI (US)

( * ) Notice: Subject to any disclaimer, the term of this patent is extended or adjusted under 35 U.S.C. 154(b) by 421 days.

(21) Appl. No.: 14/876,189

(22) Filed: Oct. 6, 2015

(65) Prior Publication Data

US 2016/0023792 A1    Jan. 28, 2016

Related U.S. Application Data

(63) Continuation of application No. 12/711,894, filed on Feb. 24, 2010, now abandoned.

(51) Int. Cl.
| | |
|---|---|
| *B65B 51/14* | (2006.01) |
| *B29C 65/18* | (2006.01) |
| *B29L 31/00* | (2006.01) |

(52) U.S. Cl.
CPC ............ *B65B 51/14* (2013.01); *B29C 65/18* (2013.01); *B29L 2031/7128* (2013.01)

(58) Field of Classification Search
CPC ......... B65B 51/14; B31B 19/00; B31B 19/64; E05D 7/10; E05B 57/00; E05C 5/00
See application file for complete search history.

(56) References Cited

U.S. PATENT DOCUMENTS

| | | | | |
|---|---|---|---|---|
| 2,548,367 A | * | 4/1951 | Harris | .................... E05C 19/14 |
| | | | | 292/113 |
| 3,321,353 A | * | 5/1967 | Zelnick | ................... B29C 65/02 |
| | | | | 156/515 |

(Continued)

FOREIGN PATENT DOCUMENTS

| | | |
|---|---|---|
| JP | 2008-265812 | 11/2008 |
| WO | 1998/034776 | 8/1998 |
| WO | 113178 | 12/2004 |

OTHER PUBLICATIONS

Patent Examination Report No. 2, Mar. 5, 2014, IP Australia, Wooden ACT 2606 Australia.

(Continued)

*Primary Examiner* — Robert F Long
*Assistant Examiner* — Eduardo R Ferrero
(74) *Attorney, Agent, or Firm* — George R. Corrigan

(57) ABSTRACT

A pouch machine includes an infeed section, a sealing section, and an outfeed section. The infeed section provides a pouch or laminate to the sealing section, and the outfeed section receives the sealed pouch from the infeed section. The sealing section includes at least one sealer that has a sealing fixture disposed to move in a first direction toward and away from a sealing position. A linear actuator is mounted to provide a controlled motion in a second direction, that is not the first direction. A linkage is connected between the linear actuator and the sealing fixture. The linkage translates the controlled motion of the actuator into controlled motion of the sealer. The linkage preferably multiplies force when the sealer is in the sealing position, and multiplies distance/velocity when the sealer is retracted. The sealing fixture preferably includes a die backing member and a sealing die. The die backing member has at least one clip mounted on it. The clip includes a hook end, and has a first relaxed position and a second tension position. The (Continued)

sealing die includes at least one receiver that receives the hook end. When the clip is in the tension position, the sealing die is held against the die backing member.

5 Claims, 7 Drawing Sheets

(56) References Cited

U.S. PATENT DOCUMENTS

| | | | |
|---|---|---|---|
| 3,577,495 A * | 5/1971 | Pearl et al. | B29C 51/18 264/153 |
| 3,646,856 A * | 3/1972 | Worndl | B31B 19/00 383/54 |
| 3,663,338 A * | 5/1972 | Wech | B31B 19/00 156/251 |
| 3,735,673 A * | 5/1973 | Sheehan | B31B 19/00 264/209.3 |
| 3,735,917 A * | 5/1973 | Warburton | B65D 85/324 206/521.1 |
| 3,980,805 A * | 9/1976 | Lipari | H01R 24/40 174/880 |
| 4,019,947 A * | 4/1977 | Stock | B31B 19/00 156/250 |
| 4,167,092 A | 9/1979 | Medwed | |
| 4,266,453 A * | 5/1981 | Farley | B25B 23/0035 403/294 |
| 4,270,668 A * | 6/1981 | Berfield | A47L 9/00 220/324 |
| 4,283,081 A * | 8/1981 | Shalaev | E05C 19/14 292/113 |
| 4,627,761 A * | 12/1986 | Olson | B25B 23/0035 403/324 |
| 4,697,832 A * | 10/1987 | Dickirson | F16L 37/098 285/319 |
| 4,779,400 A | 10/1988 | Hoskinson et al. | |
| 4,845,926 A | 7/1989 | Davis | |
| 4,890,869 A * | 1/1990 | Langkamp, Jr. | E05C 19/14 292/103 |
| 4,929,224 A * | 5/1990 | Hanson | B31B 19/00 493/194 |
| 4,932,293 A * | 6/1990 | Goff | B25B 13/06 81/121.1 |
| 4,999,081 A * | 3/1991 | Buchanan | B29C 65/18 156/251 |
| 5,033,778 A * | 7/1991 | Niles | E05C 19/14 206/1.5 |
| 5,039,138 A * | 8/1991 | Dickirson | F16C 1/101 285/314 |
| 5,127,684 A * | 7/1992 | Klotz | E05C 19/14 292/113 |
| 5,131,213 A * | 7/1992 | Shanklin | B29C 65/18 156/515 |
| 5,277,745 A * | 1/1994 | Williams | B26D 7/27 156/515 |
| 5,284,002 A * | 2/1994 | Fowler | B29C 65/38 493/194 |
| 5,480,197 A * | 1/1996 | Ernst | B01D 46/0004 292/113 |
| 5,752,369 A | 5/1998 | Suga | |
| 6,041,580 A | 3/2000 | Wojtech | |
| 6,253,531 B1 * | 7/2001 | Steele | B65B 51/14 100/244 |
| 6,452,354 B1 | 9/2002 | Ellsworth et al. | |
| 6,519,922 B1 * | 2/2003 | Matheyka | B65B 51/30 53/374.8 |
| 6,587,344 B1 * | 7/2003 | Ross | H01L 21/4882 165/185 |
| 6,789,371 B1 * | 9/2004 | Buysman | B29C 65/229 53/373.7 |
| 6,840,551 B2 * | 1/2005 | Evans | E05C 19/14 24/68 CD |
| 6,914,406 B1 | 7/2005 | Wilkes et al. | |
| 7,174,699 B1 * | 2/2007 | Wyman | B29C 65/743 156/515 |
| 7,226,092 B2 * | 6/2007 | Anzai | E05C 19/14 292/247 |
| 7,262,389 B2 * | 8/2007 | Irwin | B65B 9/067 156/251 |
| 7,726,104 B2 * | 6/2010 | Buchko | B65B 31/024 53/405 |
| 8,220,840 B2 * | 7/2012 | Garraffa | B63C 11/205 128/201.27 |
| 8,567,828 B2 * | 10/2013 | Andren | A45C 13/02 292/113 |
| 9,103,362 B2 * | 8/2015 | Baro | A47B 49/006 |
| 2002/0121874 A1 | 9/2002 | Ellsworth | |
| 2004/0113178 A1 | 12/2004 | Irwin et al. | |
| 2004/0256373 A1 * | 12/2004 | Irwin | B65B 9/067 219/243 |
| 2006/0049640 A1 * | 3/2006 | Lee | B25H 3/02 292/80 |
| 2008/0093018 A1 * | 4/2008 | Selle | B29C 65/10 156/251 |
| 2008/0277853 A1 * | 11/2008 | Menn | A61B 1/0014 269/87 |
| 2008/0281299 A1 * | 11/2008 | Menn | A61B 1/0014 606/1 |
| 2008/0309096 A1 * | 12/2008 | Andren | A45C 13/02 292/66 |
| 2009/0098992 A1 * | 4/2009 | Selle | B29C 59/007 493/194 |
| 2009/0255089 A1 * | 10/2009 | Boonmatun | E05C 19/14 16/231 |
| 2009/0301658 A1 | 12/2009 | Vine | |
| 2010/0801249 | 5/2010 | Hunnicutt | |
| 2010/0253065 A1 * | 10/2010 | Lotti | F16L 33/227 285/3 |

OTHER PUBLICATIONS

Southco 97—Over-Center Series Latches [Retrieved on Feb. 28, 2014] retrieved from internet <URL: http:www.southco.com/en-au/97>.

Extended European Search Report, dated Jul. 31, 2014, European Patent Office, 80298 Munich, Germany.

European Search Report, dated Apr. 30, 2015, European Patent Office, 80298 Munich Germany.

\* cited by examiner

POUCH MACHINE WITH SEALER

RELATED APPLICATIONS

This is a continuation of, and claims the benefit of the filing date of, U.S. patent application Ser. No. 12/711,894, filed on Feb. 24, 2010.

FIELD OF THE INVENTION

The present invention relates generally to the art of bag making. More specifically, it relates to pouch machines, and methods of making pouches.

BACKGROUND OF THE INVENTION

There are many known machines and methods known for making bags and pouches. Intermittent motions machines are often used to make some pouches, such as those used in the medical field. Typically such medical pouches are made from a laminate film or a mono film. Laminate film, as used herein, includes a film made up of two or more layers, such as an upper layer that is sealed in various locations to a lower layer. The layers can be comprised of different materials.

Generally, the prior art provides for intermittently advancing the laminate film. When the film is stationary, a sealing platen, cross sealer, or longitudinal sealer is lowered into contact with the film. Through a combination of pressure, temperature and time, an upper layer of the laminate is sealed to a lower layer. The platen typically includes a sealing pattern for making more than one pouch. The platen is raised after the seal is formed, and the film is advanced. A downstream cutting section cuts the film into individual pouches.

Platen, as used herein, includes sealing surfaces that form seals in both the machine and cross directions, form multiple seals in the cross direction at different machine direction locations, or form multiple seals in the machine direction at different cross direction locations. Cross sealer, as used herein, is a sealer that makes a seal that extends a greater distance in the cross direction than the machine direction. Longitudinal sealer, as used herein, is a sealer that makes a seal that extends a greater distance in the machine direction than the cross direction. Platens, cross and longitudinal sealers can have multiple sealing surfaces. Multiple sealing surfaces, as used herein, includes sealing die surfaces that form more than one seal, either in the same or different directions.

Many prior art machines have a motor located beneath the machine, and linkages translated the force to the platen. Linkage, as used herein, includes mechanical connection between two items that provides for the transmittal of force or movement from the first item to the second item, and can include pivot points, etc. The linkages are complex, and sometimes included an eccentric cam that either rocked back and forth, or fully rotated, to cause the platen to move up and down. The linkages in such systems are subject to wear and maintenance, as well as causing looseness in the system which could result in improper sealing. Also, such systems require a load cell to measure the force applied by the platen, and required loss motion to control the force.

Given the nature of the medical industry and the type of items being packaged, medical pouches are often made with strict tolerances. Prior art U.S. Pat. No. 6,452,354 (hereby incorporated by reference) attempted to teach how to make pouches adequate for the medical field. Generally, it taught to use a single servo motor to drive the sealing platen, and to use a force transducer to measure the force exerted by the platen. The force was used as feedback to control the servo motor. U.S. Pat. No. 6,452,354 used the force feedback to purportedly account for process variations such as properties of the material used, wear of a rubber backing surface, etc.

However, because this prior art patent uses force as its main control parameter, it requires an add-on force transducer and cannot rely on already available servo motor feedback, which adds cost and complexity. Also, it teaches the use of a single servo motor, which can result in an unbalanced platen (i.e., more force on one side than the other). Moreover, it is primarily concerned with applying sufficient force and does not recognize that the force should be controlled to prevent fracturing of the laminate film. Rather, it teaches to control excess force merely with a safety relay to prevent damage to the machine.

Another prior art machine, described in U.S. patent application Ser. No. 12/265,428 and PCT application PCT/US09/60620, and sold as the PDI® 600SS pouch machine (shaped seal), and made by CMD® Corp. provided for a platen driven by two vertically mounted Exlar® roller screw actuators (also called linear actuators). Linear actuator, as used herein, is a device that converts some kind of power, such as hydraulic or electric power, into linear motion.

The actuators drive the platen up and down, using guides mounted beneath the actuator, toward the midline in the cross direction, away from the edge of the machine. A clevis mount is used. Two actuators are used because of the force needed to drive the platen down, into a rubber backing, to make the seal. This design avoids the linkages of the prior art using under mounted servo motors, However, it requires two actuators (which can be expensive) to obtain the desired force, and requires space above the machine for the actuator (which moves vertically) to be mounted, and cannot be mounted beneath the machine.

Prior art pouch machine sealers typically included a sealing die that has the sealing surface thereon. The sealing die is often attached to a die backing member. The sealing die can be affixed to the die backing member, such as with cap screws. However, it is sometimes desirable to change the sealing die, due to wear or to provide a different sealing profile. In such cases the entire sealer could be changed, but that can be costly and time consuming. Unscrewing the sealing die from the die backing member requires a tool and is time consuming. Some prior art machines have quick change sealing dies, that include a spring loaded L clip. Such clips are expensive.

Accordingly, a pouch machine that moves a platen, cross sealer, or longitudinal sealer that avoids complex linkages, applies force evenly, and is not excessively expensive is desirable. Also, a sealing die that can be easily removed and replaced, without expensive clips, is also desirable.

SUMMARY OF THE PRESENT INVENTION

According to a first aspect of the invention a pouch machine includes an infeed section, a sealing section, and an outfeed section. The infeed section provides a pouch or laminate to the sealing section, and the outfeed section receives the sealed pouch from the infeed section. The sealing section includes at least one sealer that has a sealing fixture disposed to move vertically toward and away from a sealing position. A linear actuator is mounted to provide a controlled horizontal motion. A linkage is connected between the linear actuator and the sealing fixture. The linkage translates the controlled horizontal motion into the vertical motion of the sealing fixture. The linkage translates a first horizontal distance into a lesser vertical distance.

According to a second aspect of the invention a pouch machine includes an infeed section, a sealing section, and an outfeed section. The infeed section provides a pouch or laminate to the sealing section, and the outfeed section receives the sealed pouch from the infeed section. The sealing section includes at least one sealer that has a sealing fixture disposed to move in a first direction toward and away from a sealing position. A linear actuator is mounted to provide a controlled motion in a second direction, that is not the first direction. A linkage is connected between the linear actuator and the sealing fixture. The linkage translates the controlled motion in the first direction over a first distance into the motion of the sealing fixture over a second direction, wherein when the second distance is less than the first distance.

According to a third aspect of the invention a pouch machine includes an infeed section, a sealing section, and an outfeed section. The infeed section provides a pouch or laminate to the sealing section, and the outfeed section receives the sealed pouch from the infeed section. The sealing section includes at least one sealer that has a sealing fixture disposed to move in a first direction toward and away from a sealing position. A linear actuator is mounted to provide a controlled motion in a second direction, that is not the first direction. A linkage is connected between the linear actuator and the sealing fixture. The linkage translates the controlled motion in the first direction having a first force into the motion of the sealing fixture having a second force wherein when the second force is greater than the first force.

According to a fourth aspect of the invention a sealing fixture for use in a pouch machine includes a die backing member and a sealing die. The die backing member has at least one clip mounted on it. The clip includes a hook end, and has a first relaxed position and a second tension position. The sealing die includes at least one receiver that receives the hook end. When the clip is in the tension position, the sealing die is held against the die backing member.

In various alternatives the sealer is a longitudinal sealer, a cross sealer, or a platen.

The sealer includes a pair of rail bearings, which are disposed to guide the vertical motion of the sealing fixture in other alternatives.

The linear actuator is a screw drive in another alternative.

The sealing section includes a second sealer and/or additional sealing fixtures in other alternatives. The number of sealing fixtures may be equal to the number of linear actuators.

The linear actuator receives a feedback signal indicative of at least one output parameter of the linear actuator, such a torque, distance, force, and velocity in various alternatives.

The clip is a lever actuated latch, and the hook end is the end of a curved latching spring, and/or the die backing member includes a source of heat in various alternatives.

Other principal features and advantages of the invention will become apparent to those skilled in the art upon review of the following drawings, the detailed description and the appended claims.

Figure 1:
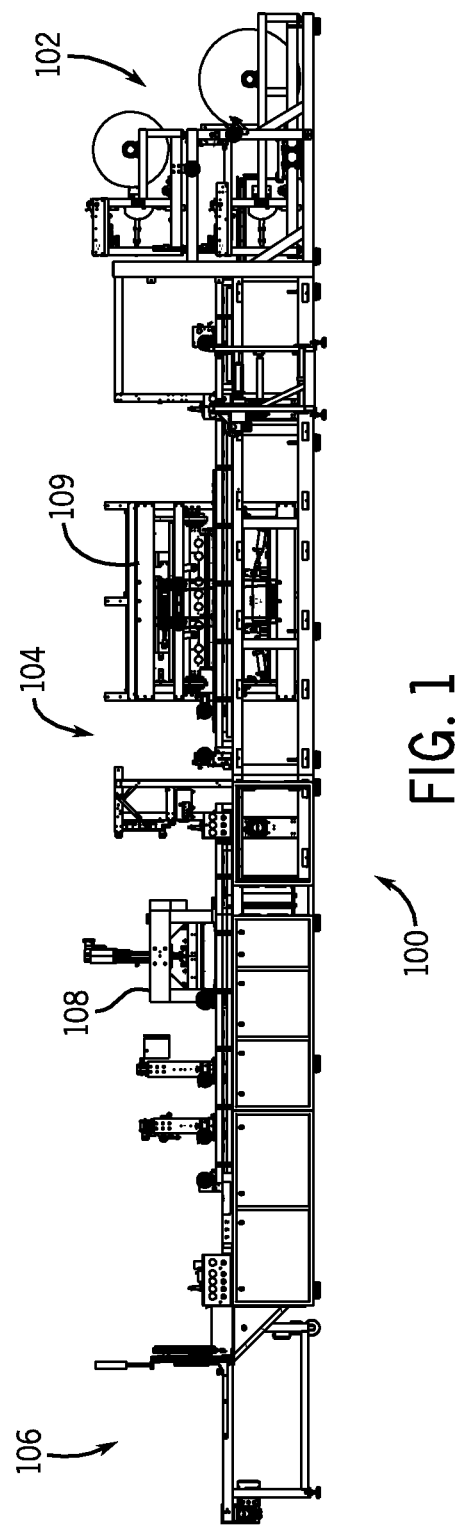
FIG. 1 is a diagram of a pouch machine in accordance with the preferred embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular pouch machine, with particular components, it should be understood at the outset that the pouch machine can be implemented with other machines and other components Referring now to FIG. 1, a pouch machine 100 in accordance with the present invention is shown. It includes an infeed section 102, a sealing section 104 and an outfeed section 106. Infeed section, as used herein, is a portion of the machine that receives material to be made into pouches, or partially made pouches, and transports them to a sealing section. Sealing section, as used herein, is the section of a pouch machine where one or more seals are imparted to form or partially form a pouch. Outfeed section, as used herein, is a portion of the machine that receives from a sealing section material that has been at least partially made into pouches, and transports them from the sealing section.

Infeed section 102 receives a laminate (or partially formed pouches, tube material, or a mono layer material in other embodiments), and provides the laminate, unsealed pouches, or partially formed pouches, to sealing section 104. Sealing section 104 includes a platen sealer 108, longitudinal sealers 109 and operates to impart one or more seals, in the preferred embodiment, to the laminate, thereby forming, or partially forming, the sealed pouches. After the pouches are made they are received by outfeed section 106 for stacking, etc. Sealed pouch, as used herein, includes pouches that have all or some of the seals that form the pouch completed. Sealer, as used herein, is a portion of a sealing section that has one or more sealing surfaces on a sealing die held against or affixed to a die backing member, as well as linkages etc that cause the sealing surfaces to move toward and away from a sealing position, and a source of heat. Unsealed pouch, as used herein, includes a pouch, or material to be made into a pouch, that has at least one seal not yet formed, and can include pouches with one or more seals formed, or no seals formed.

Pouch machine 100 operates consistently with the prior art, and in particular consistent with the PDI® 600SS pouch machine (shaped seal), and made by CMD® Corp., except for the actuator, linkages, sealing die, and related components as set forth herein.

Generally, sealing section 104 includes one or more sealing fixtures that are brought downward into contact with the laminate or pouch, and impart a seal to the pouch. The preferred embodiment provides that the sealing fixtures move vertically, and are driven by a single horizontally mounted linear actuator. A linkage between the linear actuator and the sealing fixture is such that the vertical distance the fixture travels is less than the horizontal distance the actuator head travels, when the sealing fixture is in or near the sealing position. Thus, due to conservation of energy, the force in the vertical direction is greater than the force in the horizontal direction, and a smaller less expensive actuator may be used.

Alternative embodiments provide that sealing section 104 provides other functions, such as cooling, perforating, cutting, punching, etc. These functions may be performed solely, or in combination with other functions. Also, the sealing fixture can be top mounted (brought downward to make the seal), bottom mounted (moved upward to make the seal), or with two fixtures, one top mounted and the other bottom mounted (the two fixtures move together—one up and one down) to make the seal. Other embodiments provide for the movements to be other than horizontal and vertical.

Figure 2:
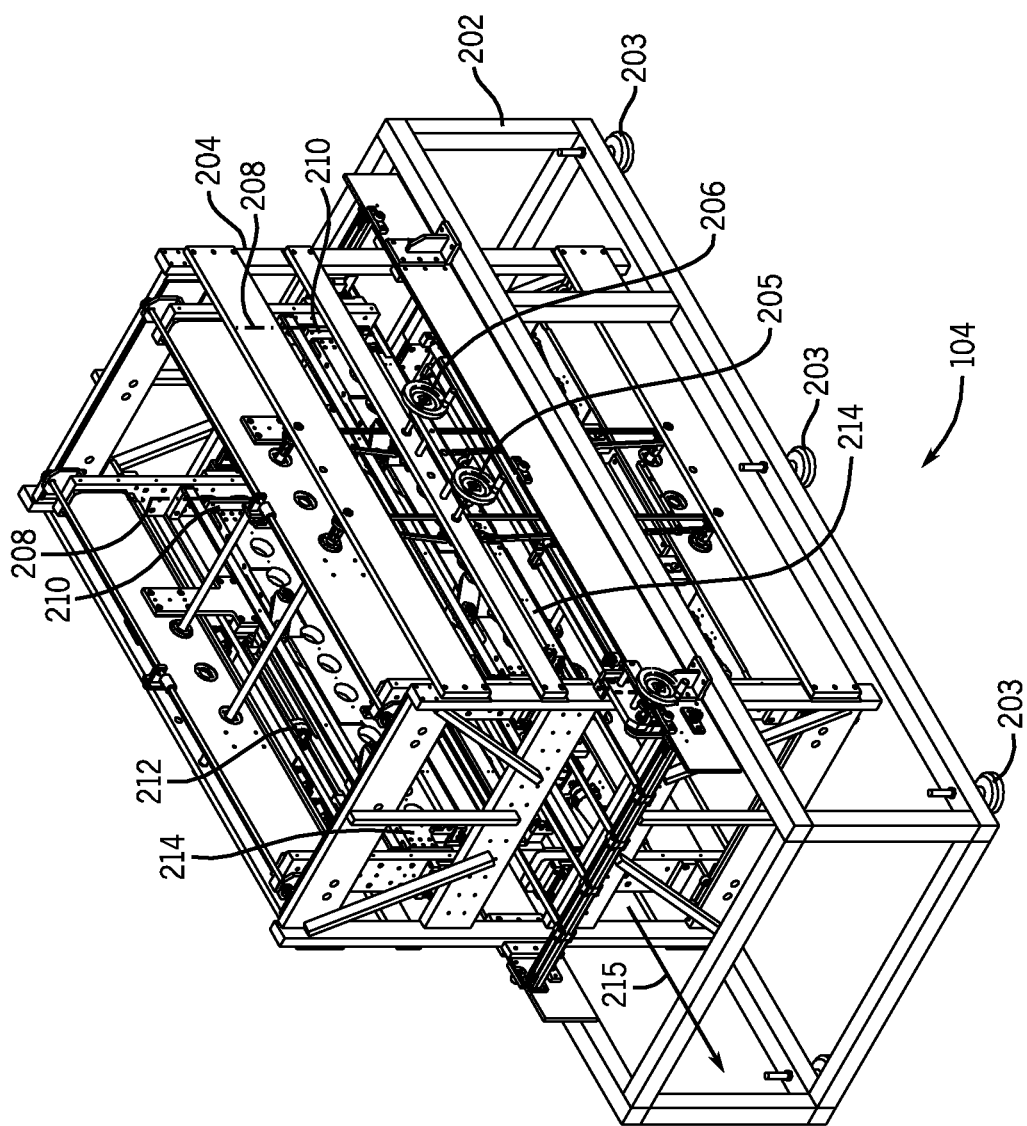
FIG. 2 is a perspective view of a sealing section in accordance with the preferred embodiment.

Referring now to FIG. 2, sealing section 104 includes a frame 202, a plurality of feet 203, a carriage 204, a pair of adjustment hand cranks 205 and 206, a plurality of rails 208 and bearings 210 that together form rails bearings, a linear actuator 212, and a pair of sealers, each having a longitudinal sealing fixture 214, that cooperate to form seals on a pouch. After the seals are formed, the pouch leaves sealing section 104 to outfeed section 106, in the direction of arrow 215.

Frame 202 mounted is mounted on feet 203. A carriage 204 is affixed to frame 202. Carriage 204 can move with respect to frame in alternative embodiments. Hand cranks 205 and 206 can be used to adjust the position of the seals. These components are arranged and function as they do in the prior art. The components that are different are described in greater detail.

Sealing fixtures 214 each include linear actuator 212 (one shown), preferably a roller screw actuator such as an Exlar® GSX40 actuator. As will be described in greater detail below, linear actuator 212 provides horizontal movement. That horizontal movement is translated into vertical movement of a sealing head, guided by rail bearings, including rails 208 and bearings 210 (two of four are show). Rail bearings 208/210 are provided for each end of each sealing fixture, and are mounted at the cross direction edge. This provides for better support, particularly when a cross sealer or platen sealer is used. Guiding the motion of the sealing fixture, as used herein, includes directing the motion in a desired direction.

Figure 3:
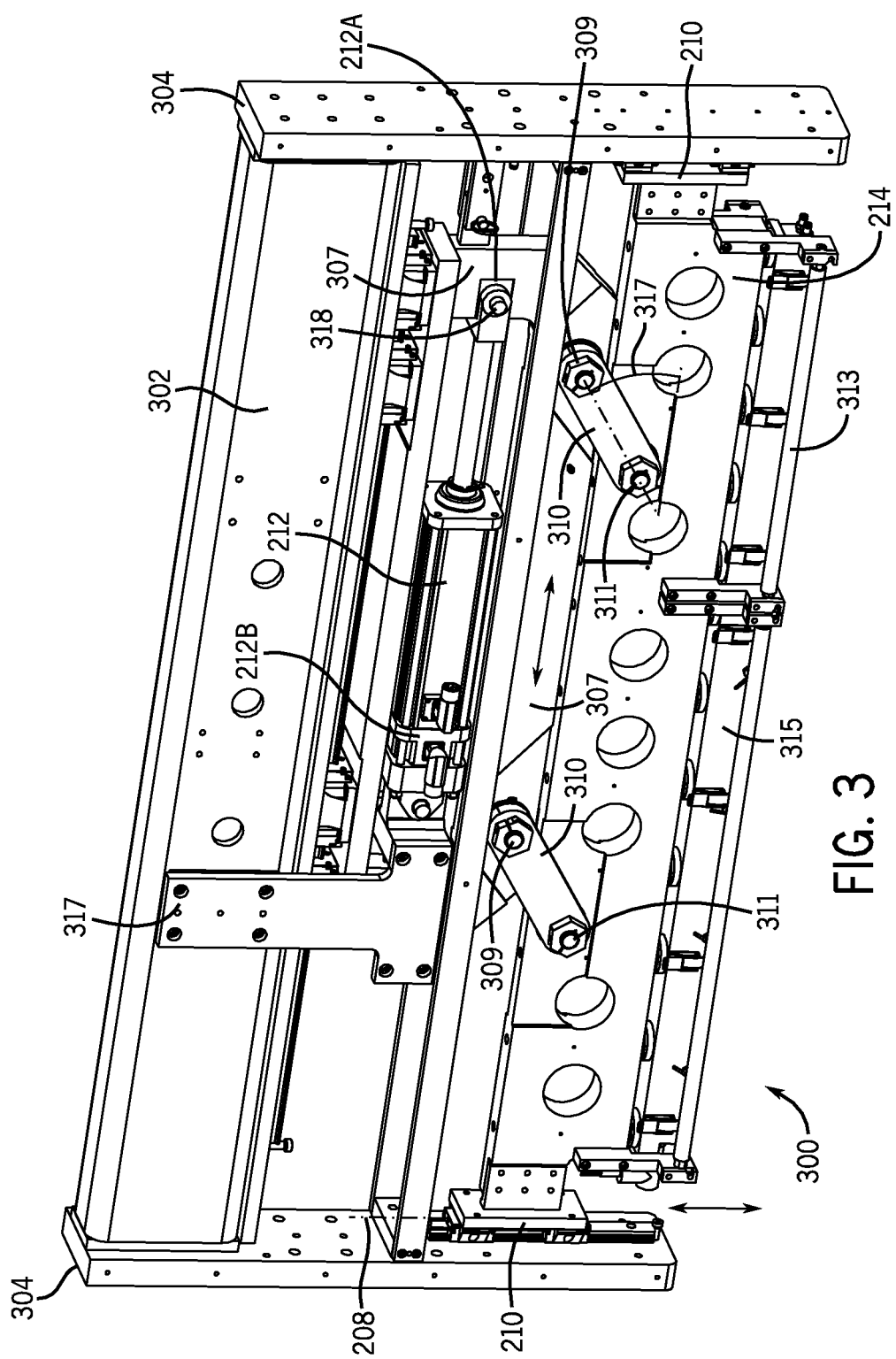
FIG. 3 is a perspective view of a sealer in accordance with the preferred embodiment.

Referring now to FIG. 3, a sealer 300 is shown. Sealer 300 can be mounted to be either a cross sealer or a longitudinal sealer, and is shown at a slight angle. In operation sealer 300 is preferably mounted so that the sealing surface is horizontal, but it can be orientated at any angle. Sealer 300 includes a pair of fixed brackets 304, each with rail bearing 208/210, linear actuator 212, sealing fixture 214, which includes a sealing die 313 and a die backing member 315, a top bracket 302, a U-shaped bracket 307, and a linkage including a pair of bars 310, each connected at each end by a pair of pivoting bolts (or pins) 309 and 311.

Sealing die 313 is mounted to die backing member 315. It can be affixed thereto, or mounted using a quick change system, as described below. Die backing member 315 includes bearings 210 at each end that are slidably connected to rail 208, which is in fixed bracket 304. Thus, sealing fixture 214 can move vertically, but is fixed and prevented from moving horizontally. As shown in FIG. 3, sealing fixture 214 is in an extended position where it makes contact with the laminate to from the seals (down, in the preferred embodiment). Fixed brackets 304 are mounted to carriage 204, at the edges of carriage 204 in the machine direction. This provides good support and stability, which helps with precisely placing the seals in a desired location.

Die backing member, as used herein, is the portion of a sealing fixture to which the sealing die is affixed, and can include a heat source, mounting brackets, pivotable connections, etc. Sealing fixture, as used herein, includes the sealing surfaces, which are part of a sealing die, which is fixed to or held against a die backing member, which can include a source of heat. Sealing die, as used herein, includes the surfaces used to form seals, and the base on which those surfaces reside.

The linkage is connected to sealing fixture 214 by pivoting bolts 311. Pivoting bolts 311 are also connected to the lower end of bars 310. The upper end of bars 310 are connected by pivoting bolts 309 to U-bracket 307.

Linear actuator 212 is mounted at an end 212B to bracket 317, which is fixed. Thus, end 212B of linear actuator 212 is fixed. An end 212A of linear actuator 212 moves and is connected to U-bracket 307 by bolt 318.

When end 212A moves to the right, it moves U-bracket 307 to the right. Bolts 309 also move to the right, because they are attached to U-bracket 307. U-bracket 307 is slidably attached with rial bearings to fixed top bracket 302. The upper end of bars 310 move to the right with bolts 309. The lower end of bars 310 cannot move left or right since they are fixed left-to-right by being attached to sealing fixture 214, which is held left-to-right by fixed brackets 304. As the top end of bars 310 move to the right, and pivot about bolts 309 and 311, sealing fixture is pulled upward (to maintain the fixed distance between bolts 309 and 311).

Likewise, when end 212A moves to the left, it moves U-bracket 307 to the left. Bolts 309 also move to the left, because they are attached to U-bracket 307. The upper end of bars 310 move to the left with bolts 309. As the top end of bars 310 move to the left, and pivot about bolts 309 and 311 sealing fixture is moved downward (to maintain the fixed distance between bolts 309 and 311). Thus, the linkage between linear actuator 212 and sealing fixture 214 translates the horizontal motion of linear actuator 212 to vertical movement of sealing fixture 214.

Horizontal motion, as used herein, is motion that is horizontal or substantially horizontal, such as motion that overall results in ten times more horizontal distance than vertical distance traveled. Vertical motion, as used herein, is motion that is horizontal or substantially horizontal, such as motion that overall results in ten times more vertical distance than horizontal distance traveled.

Figure 4A:
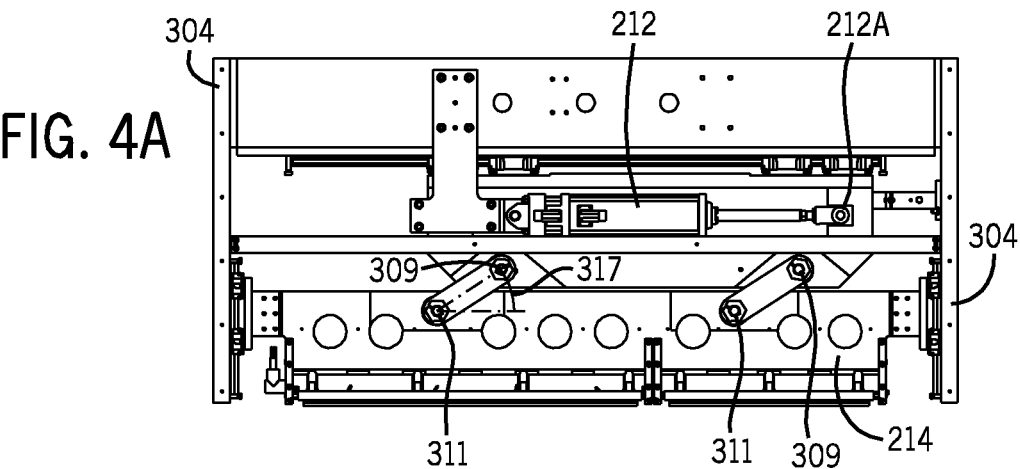
FIG. 4A is a diagram of a sealer showing the sealing die in a retracted position in accordance with the preferred embodiment.
Figure 4B:
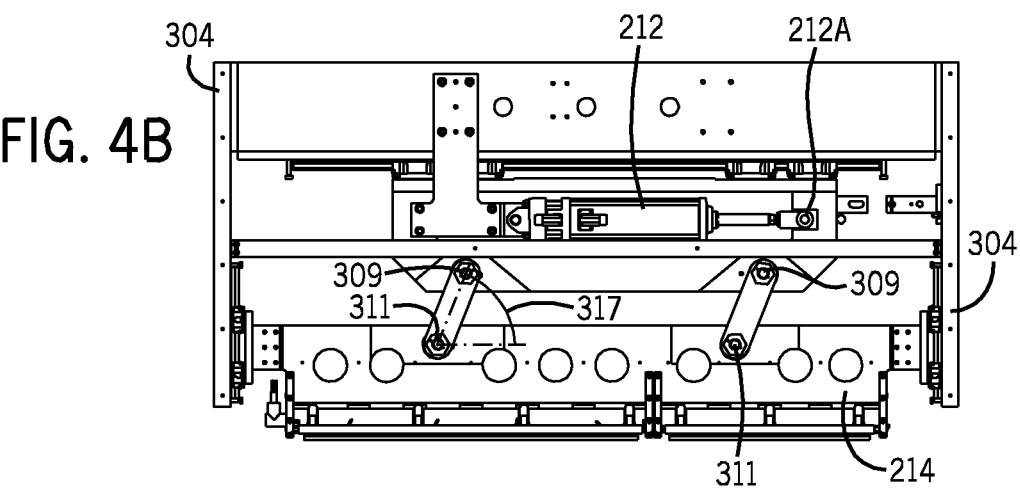
FIG. 4B is a diagram of a sealer showing the sealing die in a middle position in accordance with the preferred embodiment.
Figure 4C:
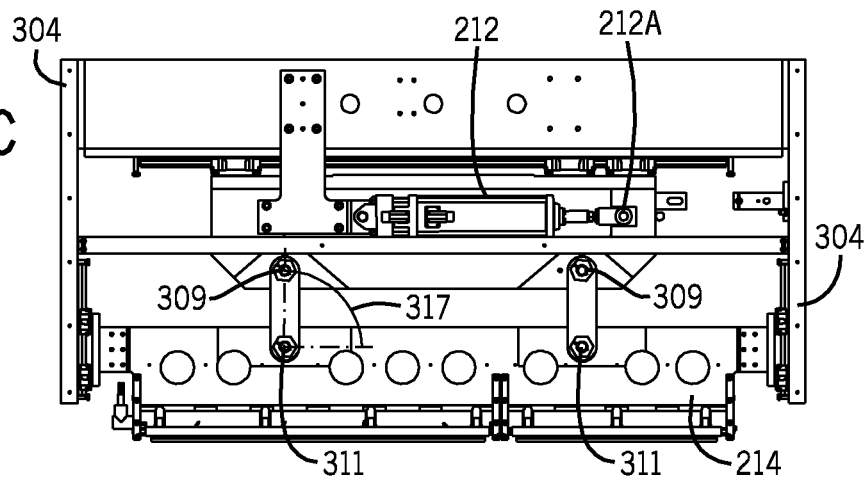
FIG. 4C is a diagram of a sealer showing the sealing die in a sealing position in accordance with the preferred embodiment.

FIGS. 4A-4C show sealing fixture 214 in the uppermost position used during shut down (FIG. 4A), mid-position used as retracted while running (FIG. 4B), and lowered position (FIG. 4C). Various positions of end 212A of linear actuator 212 is shown as well, with the right most position shown in FIG. 4A, mid position in FIG. 4B, and left most position in FIG. 4C.

The position shown in FIG. 4A is a retracted condition during a stopped or shut down condition. The unit can also be mechanically locked into place in this position to safely maintain or change dies. The position show in FIG. 4B is the retracted position during run. The cycle rate of the machine is often limited by the distance the sealing dies need to travel between the sealing positions and the retracted position. The preferred embodiment provides that during a stop condition the sealing die is farther from the web than when retracted while running. This limits the distance traveled when retracting, allowing for greater cycle rates (machine speed).

The precise controlled of the preferred embodiment results in being able to provide a retracted, maintenance position with enough retracted clearance to not heat affect the web (FIG. 4A), a shorter retracted position during run to maximize cycle rates of the mechanism (FIG. 4B), and a sealing position that allows precise control of the sealing properties (FIG. 4C).

A complete cycle of motion involves starting in the position shown in, FIG. 4A, with sealing fixture 214 in the upper position. End 212A of linear actuator 212 moves left, resulting in sealing fixture 214 moving downward, past the position in FIG. 4B, until the position of FIG. 4C is reached. The seal is formed, and then end 212A of linear actuator 212 moves right, drawing sealing fixture 214 upward, past the position in FIG. 4B, until the position of FIG. 4A is reached. The motion and force of linear actuator 212 can be precisely controlled, thus the motion and force of sealing fixture 214, and sealing die 313, can be precisely controlled.

The motion of end 212A of linear actuator 212 and the motion of sealing fixture 214 is controlled motion, and the force applied by linear actuator 212 and the force applied by sealing fixture 214 to make the seal is precisely controlled. The force and motion can be constant, or follow a controlled profile, where greater velocity is used to move sealing die 313 into position, and greater force is exerted with less motion as the seal is formed. Controlled motion, as used herein, is motion that has a controlled velocity, distance or force. Controlled force, as used herein, is force that has a controlled magnitude or controlled profile. Controlled profile, as used herein, is a parameter that has magnitude that is constant or varies, such as over time, distance, angle, etc. along a pre-determined curve.

The linkage of FIG. 4 provides the additional benefit of multiplying force (and reducing distance) at the position where the seal is formed, while multiplying distance (and multiplying velocity) at the position where sealing die 313 is retracted. Specifically, force multiplied by distance is the same for actuator 212 and sealing die 313 (given conservation of energy). However, the geometry of the linkage provides that the vertical distance sealing die 313 moves divided by the horizontal distance the actuator end 212A moves is the tangent of the angle 317 of FIGS. 3 and 4A-4C. In other words, where H is the horizontal distance end 212A travels, and V is the vertical distance sealing die 313 travels, $\tan(\alpha)=V/H$, or $V=H*\tan(\alpha)$, where * means multiply, and alpha is angle 317. For any angle, $V*V+H*H=D*D$, where D is the distance between bolts 309 and 311. A change from position H1 to position H2 (or), results in a change in vertical position.

The geometry of the linkage provides that for a given change in H, the change in V is greater than the given change in H for a less than 45 degrees, and the change in V is less than the given change in H for a greater than 45 degrees. This "distance multiplier" is greatest when a is smallest, and sealing die 313 is farthest from the sealing position. This means that sealing fixture 214 moves fastest when it is farthest from the laminate, and then slows as it approaches the laminate. This is helpful to more precisely control the motion as sealing die 313 approaches the sealing position. Velocity directly relates to distance, since the time it takes end 212A to travel ΔH is the same as the time it takes sealing die 313 to move ΔV. Sealing position, as used herein, is the location where the sealing surface makes contact with the pouch (or material being formed into a pouch) to impart heat to form a seal on the pouch.

The geometry of the linkage provides another advantage. Energy must be conserved at either end of the linkage, so force*distance (distance is ΔV or ΔH) is the same for actuator end 212A movement and for sealing die 313. Since ΔV is less than ΔH when sealing die 313 is in the sealing position, the force of actuator 212 is multiplied when the seal is being made. Thus, the force needed to push into the rubber backing, and the force needed to make the seal, can be obtained using a smaller and less costly actuator.

The linkage thus multiplies the distance (and velocity) of sealing die 313 when it is retracted (as shown in FIG. 4A), and multiplies the force, while dividing the distance and velocity of sealing die 313 when it is in the sealing position (as shown in FIGS. 3 and 4C). Other linkages and other geometries can provide multiplication, although the specific calculation may change.

A first force is greater than a second force, as used herein, when the magnitude (without regard to the direction) of the first force is greater than the magnitude of the second force. A first distance is less than a second distance, as used herein, when the magnitude (without regard to the direction) of the first distance is greater than the magnitude of the second distance.

The force multiplication can be particularly useful when compressing a rubber backing, as is often need when properly forming a seal. As the rubber compresses, even greater force is required to further compress the rubber. The force multiplication of the linkage allows that force to be obtained using a single actuator.

Actuator 212 preferably includes a built in feedback system, and thus can provide a desired torque, distance, velocity, etc. The feedback can be any output parameter of the linear actuator. Output parameter of the linear actuator, as used herein, includes physical parameters, such as position, distance, time, force, torque, power, work, etc. Torque applied to the linear actuator by the motor can be used to determine force at the sealing surface. Distance parameter from the motor can be used to determine distance of the linear actuator, and the sealing die. Thus, the linear actuator feedback system can be used as feedback of the sealing surface, and external load sensors are not required (but can be used).

Alternatives provide for multiple sealing sections, or additional other sections. Sealing fixtures mounted to seal from the bottom, or pairs that seal from both top and bottom. The pair arrangement has another sealing fixture mounted under the laminate, that is controlled to move into the sealing position in coordination with the sealing fixture above the laminate. Both sealing fixtures can be consistent with the description above or below, or one or both can be as in the prior art.

Figure 5A:
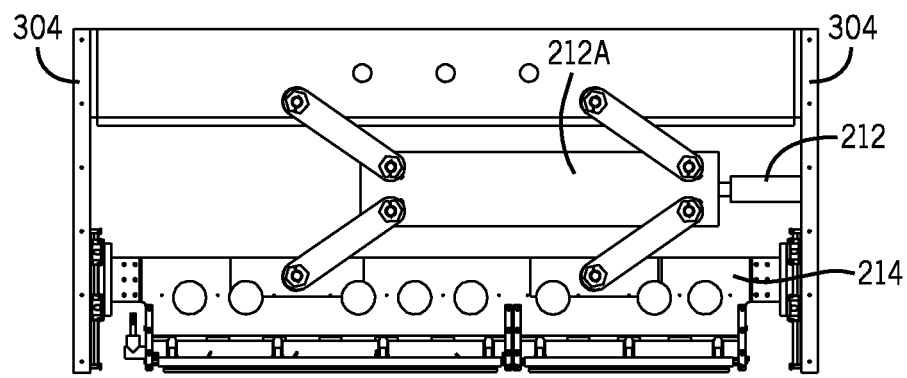
FIG. 5A is a diagram of an alternative linkage in accordance with the preferred embodiment.
Figure 5B:
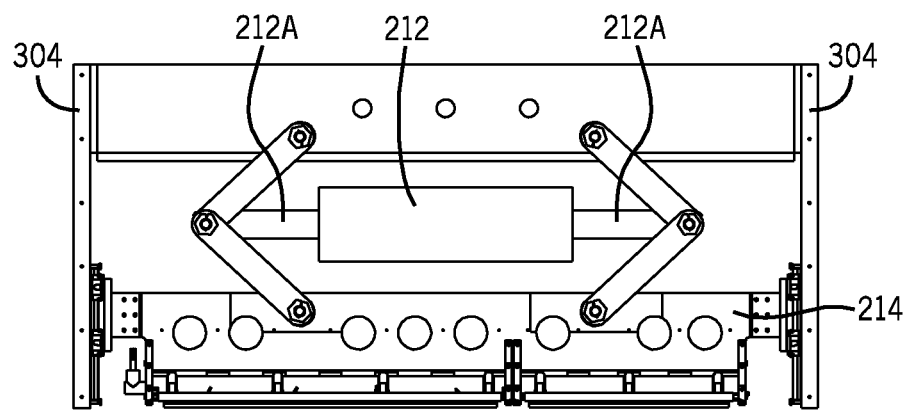
FIG. 5B is a diagram of an alternative linkage in accordance with the preferred embodiment.

Two alternative linkages and geometries are shown in FIGS. 5A and 5B. The alternatives include fixed brackets 304, sealing fixture 214, and actuator 212, with moving end 212A. Other alternatives are also possible.

In each of the above embodiments sealing die 313 is held against die backing member 315. Held against, as used herein, includes holding in a desired position, so as to allow use in the desired operation. They may be screwed or bolted together, or held together with known quick change systems. However, the preferred embodiment uses a novel quick change system.

Figure 6:
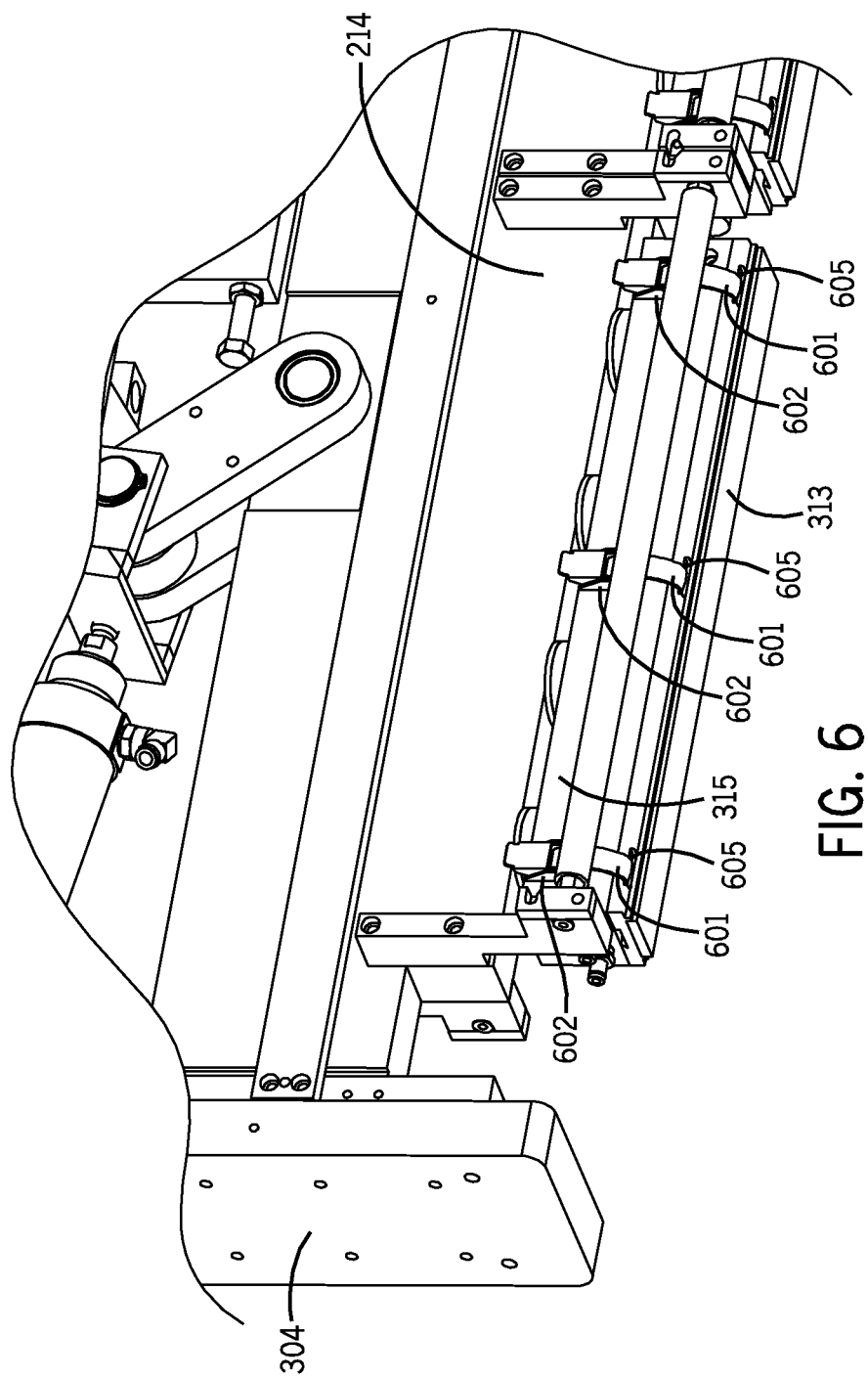
FIG. 6 is a perspective of a sealing die clipped to a die backing member in accordance with the preferred embodiment.
Figure 7:
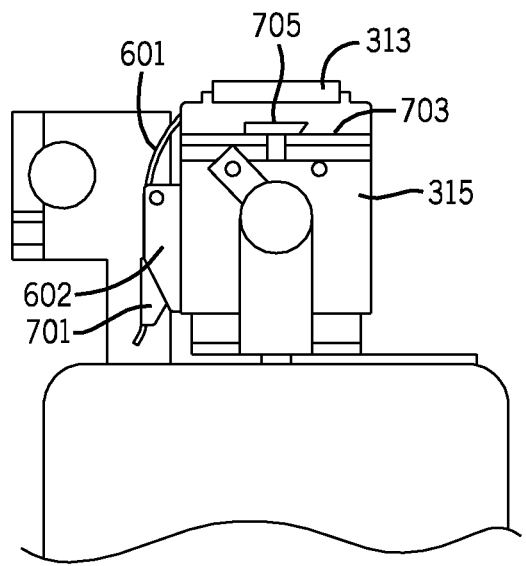
FIG. 7 is an end view of a sealing die clipped to a die backing member in accordance with the preferred embodiment.
Figure 8:
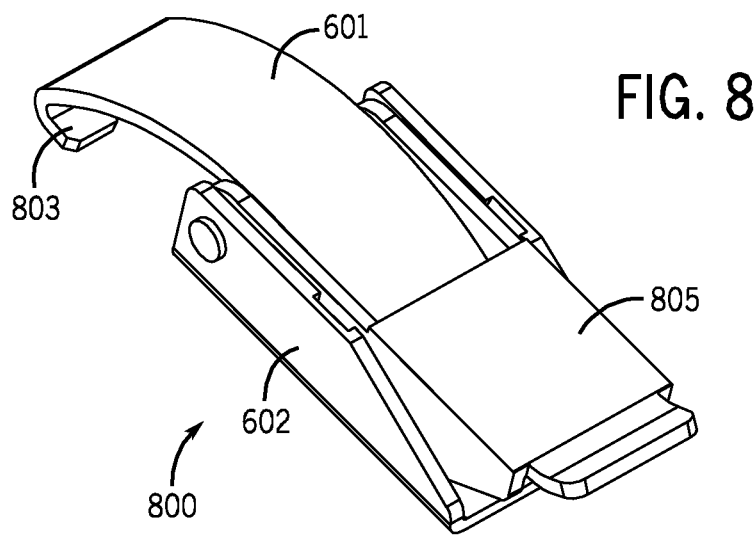
FIG. 8 is a clip in accordance with the preferred embodiment.

Referring now to FIG. 6, a plurality of clips are shown holding sealing die 313 against die backing member 315. Sealing die 313 is below die backing member 315. FIG. 7 is a side view, but upside down to (with sealing die 313 above die backing member 315) so that the clip is more easily seen with a single clip is visible, and holding sealing die 313 against die backing member 315. A single clip 800, not in use, is shown in FIG. 8. Clip, as used herein, is an easily removable device that holds two pieces in a desired position, such as a device to hold a sealing die against a die backing member.

Each of the clips 800 includes a mounting member 602, which is fixedly mounted, such as bolted or screwed, to die backing member 315. Fixedly mounted, as used herein, means attached so as to be not removable with the use of tools etc. The clips include a curved latching spring 601, having a hook end 803. A lever actuated latch 805 is used to engage the clip between a latching (also called tension or holding position) and a relaxed position. By pressing on the lever 805 the clip is engaged, or disengaged. This style clip is relatively inexpensive, and is commercially available from Southco, as part number 97-50-150-12.

Lever actuated latch, as used herein, is a latch or clip that has a lever used to alternate between a holding position and a relaxed position. Curved latching spring, as used herein, is a part of a latch or clip that, when under tension, exerts force to hold two items in a desired position.

Sealing die 313 includes a plurality of recesses (also called receivers) disposed to receive hook end 803, one for each clip. Hook end 803 is inserted into recess 605, and the latch engaged. Thus, positive contact is made and sealing die 313 is held against die backing member 315. Disposed to receive the hook end, as used herein, means positioned and shaped so as to allow the hook end to be securely inserted thereinto, when the spring is under tension. Receiver, as used herein, includes a device or recess that receives a hook end of a latch, and can be part of or affixed to structure.

Die backing member includes a wedge shaped protrusion 705 that mates with wedge shaped recess 703 on sealing die 313, in the preferred embodiment. This provides further positive contact. Protrusion 705 helps locate and helps the clips secure sealing die 313 to die backing member 315. Alternatives provide for a different shape protrusion that can locate and/or secure sealing die 313, or omit protrusion 705 altogether. Clips may be provide for two or more sides of sealing die 313/die backing member 315.

Alternatives include reversing the clip and receiver (i.e., affix the clip on sealing die 313 and the receiver is in die backing member 315. Other alternatives provide for other clips, other numbers of clips, and other locations of the clips. More alternatives include an L-shaped clip that sits on the surface without a special receiver or that sits in a receiver, a notch clip with a protrusion on either the clip or the structure that mates with a receiver on the other of the clip and structure.

Numerous modifications may be made to the present invention which still fall within the intended scope hereof. Thus, it should be apparent that there has been provided in accordance with the present invention a method and apparatus for making pouches that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A sealing fixture for use in a pouch machine, comprising:
   a die backing member, including at least one clip fixedly mounted thereto, wherein the at least one clip includes a hook end, and has a first relaxed position and a second tension position, wherein the die backing member includes at least one of a mating protrusion and a mating recess; and
   a sealing die, including at least one receiver, disposed to receive the hook end, whereby when the hook end is received by the at least one receiver, and the clip is in the tension position, the sealing die is held against the die backing member, and wherein the sealing die includes the other of the mating protrusion and the mating recess, wherein the mating protrusion and the mating recess help to locate the sealing die with respect to the die backing member.

2. The fixture of claim 1, wherein the clip is a lever actuated latch, and the hook end is the end of a curved latching spring.

3. The fixture of claim 2, wherein the die backing member includes a source of heat.

4. The fixture of claim 2, wherein the receiver is a recess in the sealing die.

5. The fixture of claim 2, wherein the receiver is affixed to the sealing die.

* * * * *